March 24, 1936. E. S. COOK 2,035,045
FLUID PRESSURE BRAKE
Filed June 3, 1933 2 Sheets-Sheet 1

Fig.1.

INVENTOR
EARLE S. COOK
BY *Wm N. Cady*
ATTORNEY

March 24, 1936.     E. S. COOK     2,035,045
FLUID PRESSURE BRAKE
Filed June 3, 1933     2 Sheets-Sheet 2

INVENTOR
EARLE S. COOK
BY Wm. M. Cady
ATTORNEY

UNITED STATES PATENT OFFICE 2,035,045

FLUID PRESSURE BRAKE

Earle S. Cook, Wilkinsburg, Pa., assignor to The Westinghouse Air Brake Company, Wilmerding, Pa., a corporation of Pennsylvania Application June 3, 1933, Serial No. 674,197

21 Claims. (Cl. 303—83)

This invention relates to automatic fluid pressure brake systems of the type in which the brakes are applied by effecting a reduction in brake pipe pressure.

In the handling of long trains it is highly desirable to apply the brakes on cars at the rear end of the train as nearly as possible in synchronism with the application of brakes on cars at the head end of the train, so as to prevent slack in the train from running in at such a rate as to cause excessive and damaging shocks.

In the patent of Ellery R. Fitch, No. 1,943,593, granted January 16, 1934, a fluid pressure brake system is disclosed embodying means for accomplishing the above result, said means consisting of mechanism on the locomotive for effecting successive reductions in brake pipe pressure, and quick service means on the cars of the train responsive to each of the successive reductions in brake pipe pressure initiated at the locomotive for effecting predetermined successive local reductions in brake pipe pressure. The quick service means on the cars of the train comprises a quick service reservoir and a quick service valve device operative upon each of the successive reductions in brake pipe pressure to connect the brake pipe to the reservoir, which is normally vented, so as to effect a predetermined reduction in brake pipe pressure for serially propagating quick service action through the train and for effecting a predetermined small degree of application of the brakes, the quick service valve device being operative upon the completion of each of the successive reductions in brake pipe pressure to disconnect the quick service reservoir from the brake pipe and connect said reservoir to the atmosphere so as to vent fluid under pressure from said reservoir, thereby conditioning said reservoir to effect the next of the successive reductions in brake pipe pressure.

For controlling the communications to and from the quick service reservoir, the quick service valve device above mentioned, is provided with a slide valve having large capacity venting passages so as to cause a prompt quick service reduction in brake pipe pressure and conditioning for operation to effect a subsequent reduction in brake pipe pressure. The slide valve is operated by a piston and the differential of pressures required on said piston to move said slide valve depends mainly upon the area of the piston. If the area of the piston is too small with respect to the size of the slide valve the device will be sluggish in operation since it will require a greater differential of pressures on the piston to move the slide valve than if the piston were large, but if the piston is sufficiently large to move the slide valve on the desired small differential of pressures, the displacement volume of such a large piston, being in effect a part of the brake pipe volume, increases the brake pipe volume to such an extent as to materially interfere with the prompt serial propagation of the quick service action. Further, the displacement volume of a large quick service piston added to the volume of the brake pipe increases the amount of fluid under pressure which it is necessary to vent from the brake pipe to effect a predetermined reduction in brake pipe pressure and this reduces the rate at which the brakes can be applied and undesirably increases the time between successive reductions in brake pipe pressure, it being evident that, other conditions being the same, the time between successive reductions in brake pipe pressure determines the rate at which the brakes may be applied.

It is highly desirable that the quick service mechanism serially operate as fast as possible, and that the time interval between the successive reductions in brake pipe pressure be as short as possible in order to apply the brakes on a train in the least possible time, and the principal object of my invention is to provide mechanism for accomplishing this result.

The object is accomplished by providing a pilot valve device for controlling a quick service valve device similar in character to the one disclosed in the pending application, hereinbefore referred to, the pilot valve device being directly subject to and very sensitive to variations in brake pipe pressure. By employing a very sensitive pilot valve device, a quick service valve device may be employed which is much less sensitive to variations in pressure than the pilot valve device and thereby very prompt and positive local reductions in brake pipe pressure may be effected serially through the train at a higher rate than has heretofore been possible, and on account of the very prompt response of the sensitive quick service mechanism, the successive reductions in brake pipe pressure may follow one after the other in closer proximity than has heretofore been possible, thereby providing a brake system which is more efficient and more flexible to the will of the operator.

Other objects and advantages will appear in the following more detailed description of my invention.

In the accompanying drawings.

Figure 2:
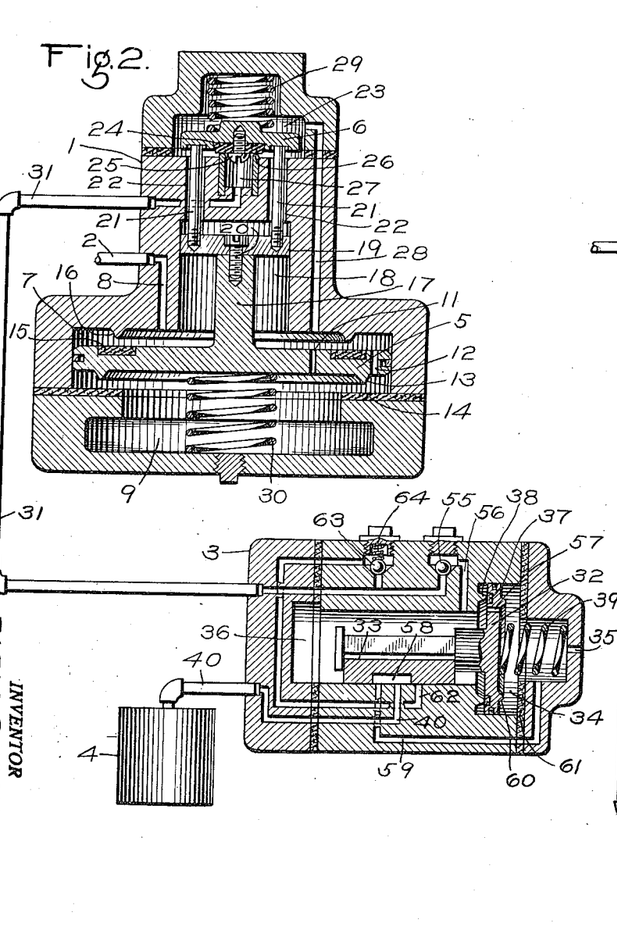
Fig. 2 is a diagrammatic view, mainly in section, of the improved quick service mechanism.

As shown in detail in Fig. 2 of the drawings, the quick service mechanism comprises a pilot valve device 1 controlled directly by variations in pressure in brake pipe 2, a quick service valve device 3 controlled by said pilot valve device, and a quick service reservoir 4.

The pilot valve device 1 comprises a casing containing a piston or other movable abutment 5 and a brake pipe vent valve 6 adapted to be controlled by said piston. The piston 5 has at one side a control chamber 7 open at all times through passage 8 to brake pipe 2, and has at the opposite side an operating chamber 9 open at all times to control chamber 7 through a small port 11 in piston 5 and also open at certain times to chamber 7 through a larger port 12 in said piston. The piston 5 is provided on one face with an annular seat rib 13 adapted in one position of said piston to engage and seal on a gasket 14, said piston carrying in the opposite face a gasket ring 15 adapted in another position of said piston to engage and seal against an annular seat rib 16 provided in the casing.

The piston 5 is provided with an operating stem 17 extending into a chamber 18 which opens into the control chamber 7. An operating plate 19, guidably mounted in chamber 18, is secured to the end of the stem 17 by a screw 20. A plurality of strut pins 21, having one end screw-threaded into plate 19, freely extend through suitable openings 22 in the casing and into a chamber 23 containing the vent valve 6.

The vent valve 6 preferably comprises a metal or hard rubber disk adapted to be engaged by the struts 21. A gasket 24 is secured to one side of said disk by means of a screw 25 and is adapted to effect sealing engagement on a seat rib 26, provided in the casing, for closing communication from chamber 23 to a chamber 27, it being noted that chamber 23 is at all times in communication with brake pipe 2 through a passage 28, the control chamber 7, and passage 8. A seating spring 29, contained in chamber 23, acts on the vent valve 6 to urge gasket 24 into sealing engagement with seat rib 26.

With the parts of the pilot valve device in the position shown in Fig. 2, the pilot valve 6 is seated and the piston 5 is positioned intermediate the gasket 14 and seat rib 16, in which position the struts 21 are adapted to engage the vent valve 6. Movement of the pilot piston 5 from the intermediate position in a direction toward vent valve 6 is adapted to unseat said vent valve, i. e. move gasket 24 away from seat rib 26, thereby opening communication from the brake pipe chamber 23 to chamber 27, but movement of the pilot piston 5 from the intermediate position in the opposite direction is relative to the vent valve 6 and thus permits said vent valve to remain seated.

A light bias spring 30 is provided in the operating chamber 9 and acts on piston 5 to maintain said piston in its intermediate position, in which struts 21 engage vent valve 6, when the fluid pressures in the control chamber 7 and operating chamber 9 are substantially equal, but the pressure of spring 30 is less than that of spring 29 plus the pressure of fluid in chamber 23 acting on the vent valve 6, so that the vent valve 6 will be normally maintained seated.

The quick service valve device 3 comprises a casing containing a piston 32 and a slide valve 33 adapted to be operated by said piston. The piston 32 has at one side a chamber 34, which is at all times open to the atmosphere through a passage 35, and has at the opposite side a chamber 36 containing the slide valve 33. A gasket 37 is provided in the inner face of piston 32 and is adapted in the normal position of said piston to engage and seal against an annular seat rib 38 in the casing. A spring 39 in chamber 34 acts on piston 32 to normally maintain said piston and slide valve 33 in the normal position, as shown in Fig. 2. The quick service reservoir 4 is connected to a pipe and passage 40 leading to the seat of the slide valve 33. The chamber 27 of the pilot valve device 1 is connected through a pipe 31 past a check valve 55 and through a passage 56 to valve chamber 36 of the quick service valve device 3.

Figure 1:
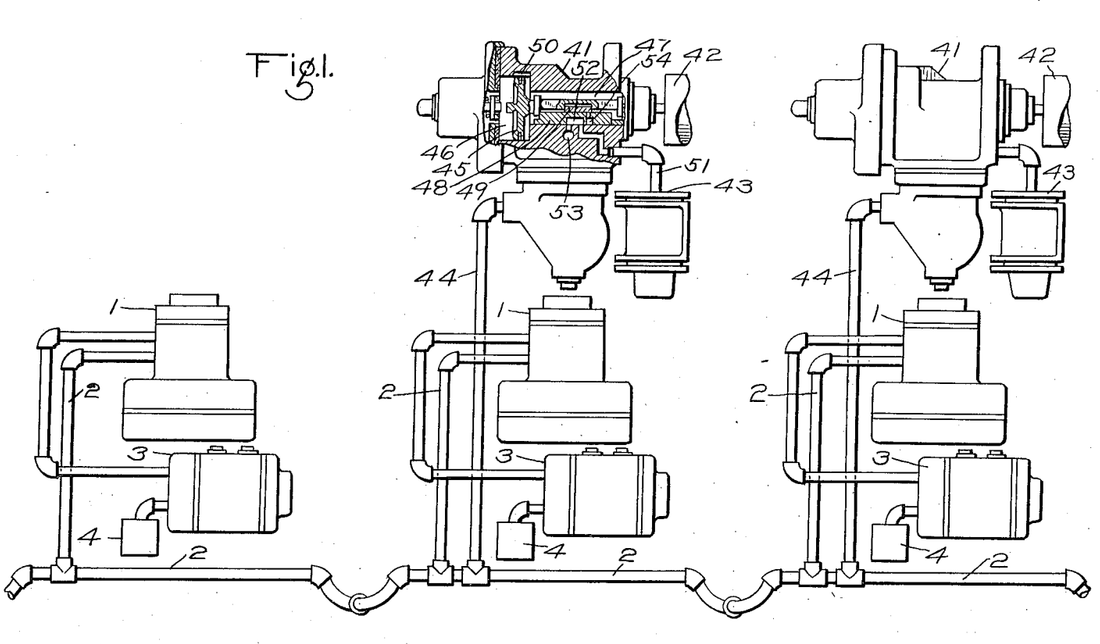
Fig. 1 is a diagrammatic view of a brake equipment for a locomotive and two cars of a train, and embodying my invention.

As shown in Fig. 1 of the drawings, my improved quick service mechanism is preferably applied to the locomotive as well as to each car of a train, the cars being equipped with the usual fluid pressure brake equipment.

The usual fluid pressure brake equipment on the cars may, for the purpose of illustration, comprise a conventional brake controlling valve device such as triple valve device 41, auxiliary reservoir 42 and brake cylinder 43.

The triple valve device 41 may comprise a casing containing a piston 45 subject to the opposing pressures of a chamber 46 connected to the brake pipe through pipe 44, and a valve chamber 47 connected to the auxiliary reservoir, said valve chamber containing the usual main slide valve 48 and auxiliary slide valve 49 adapted to be operated by said piston. Upon an increase in brake pipe pressure, the triple valve parts assume release position, such as shown in Fig. 1, in which position fluid under pressure supplied from the brake pipe 2 to the piston chamber 46 flows through feed groove 50 to valve chamber 47 and auxiliary reservoir 42. In the release position, the brake cylinder 43 is opened to the atmosphere through pipe and passage 51, a cavity 52 in the main slide valve 48 and from thence through an atmospheric passage 53. Upon a reduction in brake pipe pressure in piston chamber 46, the piston 45 is adapted to be moved by auxiliary reservoir pressure in valve chamber 47 to service position, in which fluid under pressure from the auxiliary reservoir 42 is permitted to flow through valve chamber 47 and the usual service port 54 to passage 51 and from thence to the brake cylinder 43, thereby applying the brakes. When the auxiliary reservoir pressure acting in valve chamber 47 is reduced by flow to the brake cylinder to a degree slightly less than the reduced brake pipe pressure acting in piston chamber 46, the piston 45 is operated to move the auxiliary slide valve 49 to lap position, in which the service port 54 is lapped to prevent further flow of fluid under pressure to the brake cylinder 43. Since the operation of a triple valve device of this character is so well known, and since the triple valve device forms no part of my invention, it is believed that the above brief description of its operation is sufficient for a complete understanding of the invention.

In operation, the brake pipe 2 having been charged with fluid under pressure in the usual manner, fluid under pressure supplied to the brake pipe flows to the control chamber 7 of the pilot valve device and from thence equalizes through ports 11 and 12 in the pilot valve piston 5 into the operating chamber 9, and also from chamber 7 through passage 28 into the vent valve chamber 23.

In charging the brake pipe of a train, the pressure of fluid in the brake pipe on cars at the head end of the train may exceed that normally carried, for a short period of time, and in order to prevent the operating chamber 9 at the head end of the train from becoming charged to a pressure higher than that normally carried, the flow capacity of ports 11 and 12 through the pilot piston 5 is so adjusted that a sufficient differential of pressures is obtained on said piston to move same against the pressure of spring 30 into sealing engagement with gasket 14. In this position of the pilot piston, communication through port 12 from chamber 7 to chamber 9 is cut off by the seating of rib 13 on gasket 14 so that fluid under pressure can only flow from chamber 7 to the operating chamber 9 through the small port 11. As soon as the pressure in the brake pipe reduces to normal the pressures in the control chamber 7 and the operating chamber 9 equalize through port 11, which permits spring 30 to return piston 5 to its intermediate or normal position. It is desirable to thus prevent the operating chamber 9 from becoming charged to a pressure exceeding that normally carried, for the reason that when the supply of fluid at high pressure is cut off from the brake pipe, the brake pipe pressure rapidly reduces to that normally carried, due to the flow of fluid under pressure through the brake pipe to the rear end of the train, and such a reduction might exceed the flow capacity of ports 11 and 12 to such an extent as to create a sufficient differential of pressures on piston 5 to cause said piston to move upwardly and undesirably initiate an application of the brakes on the train, which will hereinafter be described. By controlling the charging rate of the operating chamber 9, however, this undesired action can not occur.

With the pilot piston 5 in its intermediate position, as shown in the drawing, or in sealing engagement with gasket 14, the vent valve 6 is seated and chamber 27, at the lower side of the vent valve, being open through passage and pipe 31, past a check valve 55 and through passage 56 to chamber 36 in the quick service valve device 3, is open to the atmosphere, since said chamber 36 is open to the atmosphere by way of a port 57 in piston 32, piston chamber 34 and vent passage 35. With the chambers 36 and 34 in the quick service valve device 3 both open to the atmosphere, the spring 39 holds the piston 32 and slide valve 33 in their normal position, in which the gasket ring 37 carried by said piston is in sealing engagement with the seat rib 38.

In the normal position of the quick service valve device 3, the quick service reservoir 4 is open to the atmosphere through pipe and passage 40, cavity 58 in slide valve 33, passage 59, piston chamber 34 and the atmospheric vent passage 35.

Assuming that the locomotive is equipped with means such as disclosed in the pending application, hereinbefore referred to, for effecting successive light reductions in brake pipe pressure, when it is desired to effect a service application of the brakes, the brake pipe pressure is then reduced by successive light reductions in brake pipe pressure.

In the first pilot valve device 1, such as the pilot valve on the locomotive, to the rear of where the reduction in brake pipe pressure is initiated on the locomotive, the reduction in brake pipe pressure in control chamber 7 permits the pressure of fluid in operating chamber 9 to promptly move piston 5 into sealing engagement with seat rib 16. This movement of piston 5 operates through stem 17, plate 19 and strut pins 21 to shift vent valve 6 away from the seat rib 26, thereby permitting fluid under pressure to rapidly flow from the brake pipe 2 through passage 8, control chamber 7, passage 28, vent valve chamber 23, past the vent valve 6 to chamber 27 and from thence through pipe 31 to the quick service valve device 3.

Fluid under pressure supplied from the brake pipe to the quick service valve device 3 flows past the check valve 55 and through passage 56 to the slide valve chamber 36 and acts on the area of piston 32 within the seat rib 38. When the pressure thus applied to piston 32 overcomes the opposing pressure of spring 39, the piston 32 is moved outwardly, which breaks the seal between gasket 37 and seat rib 38. This allows the pressure of fluid in valve chamber 36 to act upon the full area of piston 32, and the consequent increase in force applied to said piston promptly shifts said piston to its outer position in which a seat rib 60 on said piston seals against a gasket 61.

The movement of the quick service piston 32 to its outer position moves the slide valve 33 to quick service position in which, fluid under pressure is permitted to rapidly flow from the brake pipe to the quick service reservoir 4 by way of pipe 31, past a check valve 63, through passage 62, cavity 58 in slide valve 33 and from thence through passage 40. Fluid under pressure thus flows from the brake pipe at a rapid rate until the brake pipe pressure equalizes with the pressure in the quick service reservoir 4, the volume of the reservoir being such as to produce a predetermined definite local reduction in brake pipe pressure and consequently a certain definite step in the application of the brakes, and since the communication through which fluid under pressure is supplied from the brake pipe to the quick service reservoir is large, the equalization occurs very rapidly, and causes prompt serial operation of the quick service mechanism on the cars to the rear in the train.

With the pilot piston 5 engaging seat rib 16, fluid under pressure flows from the operating chamber 9 through port 11 to the control chamber 7, and when the pressures in said chambers substantially equalize, spring 29 acting on vent valve 6 moves said vent valve into sealing engagement with seat rib 26, thereby closing communication from the brake pipe 2 to the pipe 31, and also shifts the pilot piston 5 back to its intermediate position in readiness for a subsequent reduction in brake pipe pressure. The flow capacity of port 11 through the pilot piston 5 is such with respect to the volume of the operating chamber 9 that the substantial equalization of pressures on said piston will not occur until after the quick service reservoir 4 is charged to equalization with the brake pipe.

When the pilot valve device 1 is returned to its normal position thereby cutting off the supply of fluid under pressure from the brake pipe to the quick service valve device 3, the fluid under pressure in valve chamber 36 is promptly reduced by flow through port 57 in piston 32 to chamber 34 and from thence to the atmosphere through passage 35. When the pressure in valve chamber 36 acting on piston 32 is thus reduced to a degree slightly less than the opposing pressure of spring 39, said spring starts the piston 32 and slide valve 33 moving inwardly. Upon a slight inward movement, the cavity 58 in slide valve 33 is adapted to connect passage 40, leading to the quick service reservoir 4, to passage 59 leading to the piston chamber 34, so that fluid under pressure is permitted to flow from said reservoir to said chamber and from thence to the atmosphere through passage 35.

When the quick service reservoir 4 is connected to piston chamber 34, a fluid pressure is promptly built up in said chamber, since the communication through which fluid under pressure is supplied to said chamber has greater flow capacity than the vent passage 35. The fluid pressure thus obtained in chamber 34 and acting on piston 32 aids spring 39 to promptly effect full movement of piston 32 and slide valve 33 to its normal position. The flow capacity of passage 35 is sufficiently great to permit rapid venting of fluid under pressure from the quick service reservoir 4 and, when the piston 32 is in its outer position, said passage will maintain the pressure in chamber 34 substantially atmospheric pressure while fluid under pressure is flowing to said chamber through the smaller port 57 in said piston.

It will now be evident that the quick service valve device 3 moves with a snap-like action from one position to the other, and due to the large capacity venting communications established in the different positions, a prompt and rapid reduction in brake pipe pressure is obtained followed by prompt evacuation of said reservoir. The pressure differentials required to move the quick service valve device 3 may be quite high, but this is of no particular consequence since the differentials are promptly obtained according to the operation of the pilot valve device 1 which is very sensitive to pressure changes and therefore responsive to light reductions in brake pipe pressure.

A series of successive light reductions in brake pipe pressure being initiated at the locomotive, the quick service mechanism on the cars of the train responds serially, in the manner above described, to effect predetermined local reductions in pressure in the brake pipe throughout the train and it will be evident that since the time interval between two successive reductions is only that necessary to charge the quick service reservoir and then evacuate said reservoir through the large capacity communications provided, the time interval between two successive reductions will be very short.

When the pilot piston 5 is in the upper or quick service position a leakproof seal is effected between gasket 15 and seat rib 16 so as to render the charging port 12 ineffective, and also to prevent leakage around the piston 5 from effecting the rate at which the pressure in the operating chamber 9 reduces through the control port 11. Likewise, in the quick service valve device 3 the seal effected between seat rib 60 on piston 32 and gasket 61 prevents leakage around said piston from increasing the rate at which fluid under pressure is permitted to vent from valve chamber 36 over that permitted by the control port 57.

The check valve 63 is loaded with a spring 64, so that fluid under pressure will flow past check valve 55 to valve chamber 36 before the check valve 63 is lifted against spring 64 to permit flow of fluid under pressure to passage 62. By thus holding back the supply of fluid under pressure to passage 62 prompt movement of the quick service piston 32 and slide valve 33 to quick service position is obtained, and also pressure is obtained in valve chamber 36 to hold the slide valve 33 seated against the pressure of fluid supplied to passage 62 leading to the seating face of said slide valve, it being evident that the pressure of fluid obtained in passage 62 tends to blow the slide valve 33 from its seat.

When the quick service piston 32 and slide valve 33 are moved to quick service position, in which the normally vented quick service reservoir 4 is connected to the pipe 31 through a large capacity communication, a rapid flow of fluid under pressure to said reservoir is permitted and this flow tends to temporarily reduce the pressure in pipe 31 to a degree below that required to hold piston 32 and slide valve 33 in quick service position, but the check valve 55 is provided so as to prevent back flow from valve chamber 36 to pipe 31 and thereby ensure that the quick service valve device will remain in the quick service position.

It is well known that when the brake pipe is charged to the normal pressure carried, the pressure in the brake pipe will fluctuate slightly due particularly to the alternate cutting in and cutting out of the usual feed valve device (not shown) on the locomotive in its operation to maintain the pressure in the brake pipe against leakage. With the train fully charged and the pilot valve piston 5 in its normal or intermediate position, the flow capacity of the ports 11 and 12 through said piston are such as to permit the pressure in the actuating chamber 9 to vary as the brake pipe pressure normally varies on account of operation of the feed valve device. In other words, the pilot valve device 1 will not respond to the usual fluctuations in brake pipe pressure, so it is therefore rendered stable. For causing the pilot valve device 1 to respond to a reduction in brake pipe pressure, the rate of reduction must slightly exceed the rate at which fluid under pressure can flow back from the operating chamber 9 through ports 11 and 12 in piston 5, as will be evident.

Figure 3:
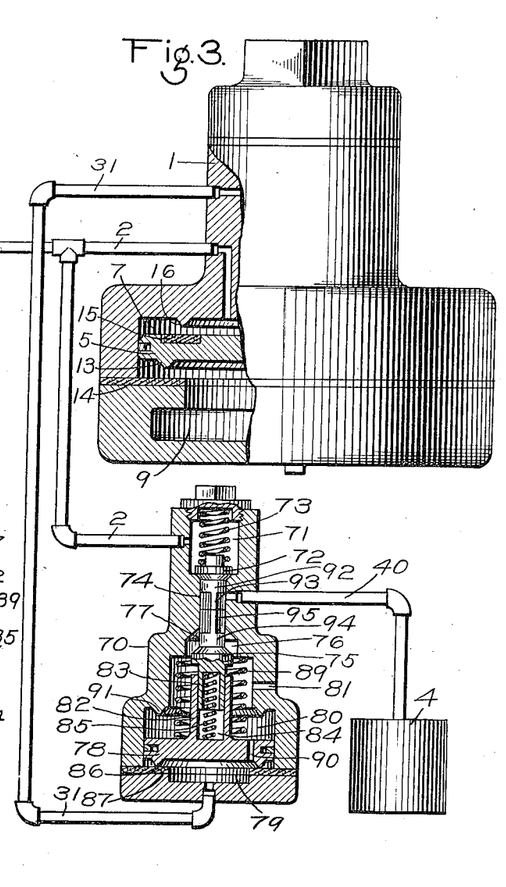
Fig. 3 is a modified form of quick service mechanism embodying my invention.

In Fig. 3 of the drawings, another form of quick service mechanism is illustrated which differs from the mechanism shown in Fig. 2 in that a simpler quick service valve device 70 is provided, and the pilot valve device 1 supplies fluid under pressure from the brake pipe to the quick service valve device 70 only for operating same, the fluid vented from the brake pipe to the quick service reservoir 4 for effecting a quick service reduction in brake pipe pressure not passing through the pilot valve device 1, as in the mechanism shown in Fig. 2.

The quick service valve device 70 comprises a casing containing a quick service valve 72, a quick service reservoir release valve 75 and a piston 78 for controlling the operation of said valves.

The quick service valve 72 is contained in a chamber 71 connected directly to brake pipe 2, and a spring 73 contained in said chamber acts on valve 72 for urging same into engagement with its seat. The quick service valve 72 is provided with a stem 74 slidably mounted in a suitable bore in the casing, the quick service reservoir 4 being connected by pipe 40 to said bore. The quick service reservoir release valve 75, which seats oppositely to valve 72, is contained in a chamber 76 and is provided with a stem 77 slidably extending into the same bore as the valve stem 74, the end of stem 77 being adapted at all times to engage the end of stem 74.

The valve stem 74 is provided with a solid cylindrical portion 92 between the valve 72 and a fluted portion 93, the cylindrical portion having a neat sliding fit in the bore in order to prevent any appreciable flow of fluid under pressure past said valve, upon unseating thereof, until the fluted portion of the valve stem 74 is moved above the bottom of the seat adapted to be engaged by said valve, at which time communication is opened from chamber 71 to the bore containing the valve stem. The valve 75 is provided with a cylindrical portion 94 and a fluted portion 95, the same as valve 72. The junctions between the cylindrical portion and fluted portion of the valve stems 74 and 77 are so related that, upon movement of valve 75 towards its seat, communication will be closed from chamber 76 to the bore containing said valve stems at the same time as or slightly in advance of opening communication from chamber 71 to said bore, while upon movement of valve 72 towards its seat, communication from chamber 71 to said bore will be closed at the same time or slightly in advance of opening communication from said bore to chamber 76.

The quick service piston 78, for controlling the operation of valves 72 and 75, has at one side a chamber 79 open to pipe 31 leading to the pilot valve device 1, and has at the opposite side a chamber 80 open to chamber 76, the chambers 80 and 76 being open to the atmosphere through an atmospheric passage 81.

For controlling the operation of valves 72 and 75, the piston 78 is provided with a hollow stem 82, and slidably mounted within said stem is a hollow stem 83 projecting from the valve 75, a chamber 84 being formed within said stems and containing a spring 85 urging the check valve 75 and piston 78 apart.

A seat rib 86 is provided on one side of piston 78 and is adapted in one position of said piston to engage and seal upon a gasket 87, and a spring 89, contained in chamber 80, is provided to urge said piston into engagement with said gasket. A through port 90 is provided in piston 78.

In the operation of the modified form of the invention, the pilot valve device 1 operates, upon a reduction in brake pipe pressure to supply fluid under pressure from the brake pipe 2 to pipe 31, in the same manner as hereinbefore described.

Fluid under pressure supplied to pipe 31 flows into piston chamber 79 of the quick service valve device 70 and acts on piston 78 within the seat rib 86. When the pressure thus applied to piston 78 slightly exceeds the opposing pressure of spring 89, the piston 78 is moved out of sealing engagement with gasket 87. The full area of piston 78 is thereby subjected to the pressure of fluid in chamber 79 which causes said piston to promptly move against the opposing pressure of spring 89 to quick service position which is defined by the engagement of said piston with a stop rib 91.

The movement of piston 78 to quick service position acts through spring 85 to seat valve 75 and at the same time unseat valve 72 against spring 73. After the valve 75 is seated, the spring 85 permits piston 78 to move relatively to said valve to the quick service position, above described.

Upon unseating valve 72, fluid under pressure equalizes directly from the brake pipe 2 through chamber 71, past valve 72, through pipe 40 and from thence into the quick service reservoir 4, thereby causing a rapid and definite local quick service reduction in brake pipe pressure for applying the brakes and for transmitting serially, quick service action throughout the train.

As the valve 75 is moved towards its seat and valve 72 is moved away from its seat, as above described, the cylindrical portion 94 of stem 77 acts to close communication from the quick service reservoir 4 to the chamber 76, which is vented to the atmosphere through passage 81, at the same time as or slightly in advance of the cylindrical portion 92 of stem 74 opening communication from chamber 71 to the quick service reservoir 4. By this construction, fluid under pressure from the brake pipe supplied past valve 72 is prevented from entering chambers 76 and 80 wherein said pressure would tend to stop movement of said piston before the valve 75 was fully seated, and even might tend to return piston 78 toward its normal position, and thereby prevent obtaining the quick service action intended. In fact, if pressure were obtained in chamber 80 as just described, and both of the valves 75 and 72 were partially unseated, a continuous leak from the brake pipe might occur past said valves to chambers 76 and 80 and from thence through passage 81 to the atmosphere. Such a leak might maintain the pilot valve device 1 in quick service position and therefore the quick service valve device 70 in the venting position just described and thereby cause an excessive and undesired reduction in brake pipe pressure. With the valve stems 74 and 77 constructed with the neatly fitting cylindrical portions 92 and 94, respectively, as above described, this undesired action cannot occur, however, since communication to chambers 76 and 80 is positively closed at the same time or slightly in advance of opening communication from the brake pipe to the quick service reservoir. It will be understood that there may be some slight leakage past the cylindrical portions 92 and 94 of the valve stems, when the valves 72 and 75 are unseated, but such leakage will not interfere with the intended operation, as above described.

After the brake pipe pressure equalizes into the quick service reservoir 4 and the pilot valve device 1 operates to cut off the supply of fluid under pressure to pipe 31, as described in connection with the mechanism illustrated in Fig. 2, the pressure in chamber 79 acting on piston 78 reduces through port 90 in said piston into chamber 80 and from thence through chamber 76 and passage 81 to the atmosphere. When the pressure in chamber 79 is thus reduced to below the opposing pressure acting on piston 80, said piston is moved away from rib 91 toward its normal position, thereby reducing the pressure of spring 85 on the valve 75.

When the pressure of spring 85 acting on valve 75 is reduced to a degree slightly below the opposing pressure of spring 73 and the pressure of fluid in the quick service reservoir 4 acting to unseat valve 75, said valve is moved away from its seat and the valve 72 is simultaneously moved toward its seat. As the valves 72 and 75 thus move toward their normal positions, the cylindrical portion 92 of the valve stem 74 acts to close communication from chamber 71 to the quick service reservoir 4 at the same time as or slightly in advance of the cylindrical portion 94 of the valve stem 77 opening communication from the quick service reservoir 4 to chambers 76 and 80, so that there will be substantially no flow of fluid under pressure from the brake pipe past valve 72 to the quick service reservoir 4, as fluid is vented from the quick service reservoir 4 to chambers 76 and 80.

Fluid under pressure vented from the quick service reservoir 4 to chambers 76 and 80 flows to the atmosphere through the atmospheric passage 81 which permits a rapid venting of fluid under pressure from said reservoir, but the flow capacity of the opening past the valve stem 77 is sufficiently greater than that of the atmospheric passage 81, that a fluid pressure builds up in chambers 76 and 80, and this pressure acting on piston 78 assists spring 89 to promptly return said piston to its normal position as shown in the drawings. After venting the quick service reservoir to the atmosphere as just described, the quick service valve device is in a condition to effect another reduction in brake pipe pressure upon operation of the pilot valve device 1.

It will be evident that by closing communication from the brake pipe 2 past the cylindrical portion 92 of valve stem 74 to the quick service reservoir 4 at the same time as or slightly in advance of establishing the venting communication from said reservoir, an undesired venting of fluid under pressure from the brake pipe, which otherwise might occur, is prevented.

By providing a quick service mechanism embodying a pilot valve device which is operated by a small differential of pressures and which is very responsive to a light reduction in brake pipe pressure at a predetermined rate, in combination with a quick service valve device controlled by the pilot valve device and operative to effect successive predetermined reductions in brake pipe pressure at a rapid rate, the time required to apply the brakes though a train is greatly reduced as compared with previous devices of a similar character, so that the brakes on the cars at the rear of the train are applied more nearly in synchronism with the brakes on the cars at the head end of the train, than has heretofore been possible.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A quick service valve device comprising a valve operative to vent fluid under pressure from the brake pipe to effect a light local reduction in brake pipe pressure and a piston subject on one side to the pressure in a chamber open to the atmosphere through a restricted port and operated upon an increase in fluid pressure in said chamber for actuating said valve, means for limiting the degree of said light reduction in brake pipe pressure, and valve means operated upon a series of successive light reductions in brake pipe pressure for effecting a corresponding series of increases in fluid pressure in said chamber.

2. In a fluid pressure brake, the combination with a brake pipe and a brake controlling valve device operative upon a reduction in brake pipe pressure to effect an application of the brakes, of means operative to effect a light local reduction in brake pipe pressure for effecting the operation of said brake controlling valve device, said means comprising a quick service valve device operative by fluid under pressure to establish a communication through which fluid under pressure is locally vented from said brake pipe, valve means controlled by the opposing pressures of the brake pipe and a chamber, and having an always open restricted communication between said brake pipe and chamber, said valve means being operative upon a reduction in brake pipe pressure to supply fluid under pressure to said quick service valve device for actuating said quick service valve device and operative upon equalization of pressures in said brake pipe and chamber for cutting off the supply of actuating fluid to said quick service valve device, and means for closing the communication through which fluid under pressure is vented from the brake pipe when the supply of actuating fluid is cut off from said quick service valve device.

3. In a fluid pressure brake, the combination with a brake pipe and a brake controlling valve device operative upon a reduction in brake pipe pressure to effect an application of the brakes, of means operative to effect a light local reduction in brake pipe pressure for effecting the operation of said brake controlling valve device, said means comprising a quick service reservoir, a quick service valve device having a normal position for venting fluid under pressure from said reservoir and movable by fluid under pressure to a position for establishing a communication through which fluid under pressure is vented from said brake pipe to said reservoir for effecting a light reduction in pressure in said brake pipe, valve means controlled by brake pipe pressure and operative upon a reduction in brake pipe pressure to supply fluid under pressure for actuating said quick service valve device and operative after said predetermined reduction in brake pipe pressure is effected to cut off the supply of actuating fluid to said quick service valve device, and means for moving said quick service valve device to its normal position when the supply of actuating fluid is cut off from said quick service valve device.

4. In a fluid pressure brake, the combination with a brake pipe and a brake controlling valve device operative upon a reduction in brake pipe pressure to effect an application of the brakes, of means operative to effect a light local reduction in brake pipe pressure for effecting the operation of said brake controlling valve device, said means comprising a quick service reservoir, a quick service valve device having a normal position for venting fluid under pressure from said reservoir and movable by fluid under pressure to a position for establishing a communication through which fluid under pressure is vented from said brake pipe to said reservoir for effecting a light reduction in pressure in said brake pipe, valve means controlled by the opposing pressures of said brake pipe and a chamber at all times in communication with said brake pipe through a restricted passage and operative upon a reduction in brake pipe pressure to supply fluid under pressure from said brake pipe to said quick service valve device for actuating said quick service valve device to effect said light reduction in brake pipe pressure, said valve means being operative upon substantial equalization of pressures in said brake pipe and chamber through said restricted passage to cut off the supply of actuating fluid to said quick service valve device, and means for moving said quick service valve device to its normal position when said supply of actuating fluid is cut off.

5. In a fluid pressure brake, the combination with a brake pipe and a brake controlling valve device operative upon a reduction in brake pipe pressure to effect an application of the brakes, of mechanism separate from the brake controlling valve device operative to effect a light local reduction in brake pipe pressure for effecting the operation of said brake controlling valve device, said mechanism comprising valve means responsive to a small degree of change in pressure in the brake pipe and in a chamber for at one time supplying fluid under pressure to a communication and then cutting off the supply of fluid under pressure to said communication, a quick service reservoir, valve means operated by fluid under pressure supplied to said communication for venting fluid under pressure from said brake pipe to said quick service reservoir and having means for venting fluid under pressure from said communication, and means for operating said valve means upon reducing the pressure in said communication to vent fluid under pressure from said quick service reservoir.

6. In a fluid pressure brake, the combination with a brake pipe and a brake controlling valve device operative upon a reduction in brake pipe pressure to effect an application of the brakes, of mechanism separate from the brake controlling valve device operative to effect a light local reduction in brake pipe pressure for effecting the operation of said brake controlling valve device, said mechanism comprising valve means responsive to a small degree of change in pressure in the brake pipe and in a chamber for at one time supplying fluid under pressure to a communication and then cutting off the supply of fluid under pressure to said communication, a quick service reservoir, valve means operated by fluid under pressure supplied to said communication for venting fluid under pressure from said brake pipe through said communication to said quick service reservoir and having means for venting fluid under pressure from said communication, and means for operating said valve means upon reducing the pressure in said communication to vent fluid under pressure from said quick service reservoir.

7. In a fluid pressure brake, the combination with a brake pipe and a brake controlling valve device operative upon a reduction in brake pipe pressure to effect an application of the brakes, of mechanism separate from the brake controlling valve device operative to effect a light local reduction in brake pipe pressure for effecting the operation of said brake controlling valve device, said mechanism comprising valve means responsive to a small degree of change in pressure in the brake pipe and in a chamber for at one time supplying fluid under pressure to a communication and then cutting off the supply of fluid under pressure to said communication, and means controlled by the pressure of fluid supplied to said communication for effecting a local reduction in brake pipe pressure, said means comprising a quick service reservoir, a movable abutment subject to the opposing pressures in said communication and a chamber open at all times to the atmosphere, and valve means operative by said abutment and having a normal position for establishing a communication through which said quick service reservoir is open to the atmosphere, said valve means being movable by said abutment, when fluid under pressure is supplied to the first mentioned communication, to a position for closing the second mentioned communication and for establishing another communication through which fluid under pressure is vented from the brake pipe to said reservoir, and means for moving said valve means and abutment to their normal position when the supply of fluid under pressure to the first mentioned communication is cut off.

8. In a fluid pressure brake, the combination with a brake pipe and a brake controlling valve device operative upon a reduction in brake pipe pressure to effect an application of the brakes, of mechanism separate from the brake controlling valve device operative to effect a light local reduction in brake pipe pressure for effecting the operation of said brake controlling valve device, said mechanism comprising valve means responsive to a small degree of change in pressure in the brake pipe and in a chamber for at one time supplying fluid under pressure to a communication and then cutting off the supply of fluid under pressure to said communication, a quick service reservoir, valve means operated by fluid under pressure supplied to said communication for venting fluid under pressure from said brake pipe to said quick service reservoir and having means for venting fluid under pressure from said communication, and means for operating said valve means upon reducing the pressure in said communication to vent fluid under pressure from said quick service reservoir, said valve means comprising a movable abutment having at one side a chamber open to said communication through one passage and open to the atmosphere through a different passage of less flow capacity and having at the opposite side a chamber open to the atmosphere through a passageway and valve means operable by said piston, when subject to fluid under pressure supplied through said communication, to establish a communication through which fluid under pressure is vented from said brake pipe to said quick service reservoir and operative when the supply of fluid to the first mentioned communication is cut off to vent the quick service reservoir to the atmosphere, and pressure exerting means in the last mentioned chamber acting on said abutment.

9. In a fluid pressure brake, the combination with a brake pipe and a brake controlling valve device operative upon a reduction in brake pipe pressure to effect an application of the brakes, of mechanism separate from the brake controlling valve device operative to effect a light local reduction in brake pipe pressure for effecting the operation of said brake controlling valve device, said mechanism comprising valve means responsive to a small degree of change in pressure in the brake pipe and in a chamber for at one time supplying fluid under pressure to a communication and then cutting off the supply of fluid under pressure to said communication, a quick service reservoir, valve means operated by fluid under pressure supplied to said communication for venting fluid under pressure from said brake pipe to said quick service reservoir and having means for venting fluid under pressure from said communication, and means for operating said valve means upon reducing the pressure in said communication to vent fluid under pressure from said quick service reservoir, said valve means comprising a movable abutment having at one side a chamber open to said communication through one passage and open to the atmosphere through a different passage of less flow capacity and having at the opposite side a chamber open to the atmosphere through a passageway, and valve means operable by said piston when subject to fluid under pressure supplied through said communication, to establish a communication through which fluid under pressure is vented from said brake pipe to said quick service reservoir and operative when the supply of fluid to the first mentioned communication is cut off to vent fluid under pressure from the quick service reservoir to the last mentioned chamber at a rate exceeding the rate at which fluid under pressure can vent from said chamber to the atmosphere through said passageway, and a spring in the last mentioned chamber acting on said abutment to initiate the operation of said valve means to vent fluid under pressure from said quick service reservoir to the last mentioned chamber.

10. In a fluid pressure brake, the combination with a brake pipe and a brake controlling valve device operative upon a reduction in brake pipe pressure to effect an application of the brakes, of mechanism separate from the brake controlling valve device operative to effect a light local reduction in brake pipe pressure for effecting the operation of said brake controlling valve device, said mechanism comprising valve means responsive to a small degree of change in pressure in the brake pipe and in a chamber for at one time supplying fluid under pressure to a communication and then cutting off the supply of fluid under pressure to said communication, a quick service reservoir, a slide valve having a normal position for venting fluid under pressure from said quick service reservoir and a quick service position for connecting said quick service reservoir to said communication, a movable abutment for moving said valve to said positions and having at one side a chamber to which fluid under pressure is supplied from said communication for operating said abutment to move said slide valve to quick service position, said chamber being open to the atmosphere through a restricted port, said abutment having at the opposite side a chamber open to the atmosphere through a restricted passage, and a spring in the last mentioned chamber for urging said abutment and slide valve to the normal position, the venting of fluid from said quick service reservoir being directed into the last mentioned chamber at a rate exceeding the venting capacity of said restricted passage.

11. In a fluid pressure brake, the combination with a brake pipe and a brake controlling valve device operative upon a reduction in brake pipe pressure to effect an application of the brakes, of mechanism separate from the brake controlling valve device operative to effect a light local reduction in brake pipe pressure for effecting the operation of said brake controlling valve device, said mechanism comprising valve means responsive to a small degree of change in pressure in the brake pipe and in a chamber for at one time supplying fluid under pressure to a communication and then cutting off the supply of fluid under pressure to said communication, a quick service reservoir, a slide valve having a normal position for venting fluid under pressure from said quick service reservoir and a quick service position for connecting said quick service reservoir to said communication, a movable abutment for moving said valve to said positions and having at one side a chamber to which fluid under pressure is supplied from said communication for operating said abutment to move said slide valve to quick service position, said chamber being open to the atmosphere through a restricted port, said abutment having at the opposite side a chamber open to the atmosphere, a spring in the last mentioned chamber for urging said abutment and slide valve to the normal position, and means for preventing back flow of fluid under pressure from said valve chamber to said communication.

12. In a fluid pressure brake, the combination with a brake pipe and a brake controlling valve device operative upon a reduction in brake pipe pressure to effect an application of the brakes, of mechanism separate from the brake controlling valve device operative to effect a light local reduction in brake pipe pressure for effecting the operation of said brake controlling valve device, said mechanism comprising valve means responsive to a small degree of change in pressure in the brake pipe and in a chamber for at one time supplying fluid under pressure to a communication and then cutting off the supply of fluid under pressure to said communication, a quick service reservoir, a slide valve having a normal position for venting fluid under pressure from said quick service reservoir and a quick service position for connecting said quick service reservoir to said communication, a movable abutment for moving said valve to said positions and having at one side a chamber to which fluid under pressure is supplied from said communication for operating said abutment to move said slide valve to quick service position, said chamber being open to the atmosphere through a restricted port, said abutment having at the opposite side a chamber open to the atmosphere, a spring in the last mentioned chamber for urging said abutment and slide valve to the normal position, and means for delaying the supply of fluid under pressure from said communication to said slide valve until the pressure obtained in said valve chamber from said communication is increased to a predetermined degree.

13. In a fluid pressure brake, the combination with a brake pipe and a brake controlling valve device operative upon a reduction in brake pipe pressure to effect an application of the brakes, of mechanism separate from the brake controlling valve device operative to effect a light local reduction in brake pipe pressure for effecting the operation of said brake controlling valve device, said mechanism comprising valve means responsive to a small degree of change in pressure in the brake pipe and in a chamber for at one time supplying fluid under pressure to a communication and then cutting off the supply of fluid under pressure to said communication, a quick service reservoir, a slide valve having a normal position for venting fluid under pressure from said quick service reservoir and a quick service position for connecting said quick service reservoir to said communication, a movable abutment for moving said valve to said positions and having at one side a chamber to which fluid under pressure is supplied from said communication for operating said abutment to move said slide valve to quick service position, said chamber being open to the atmosphere through a restricted port, said abutment having at the opposite side a chamber open to the atmosphere, a spring in the last mentioned chamber for urging said abutment and slide valve to the normal position, means for preventing back flow of fluid under pressure from said valve chamber to said communication, and means for delaying the supply of fluid under pressure from said communication to said slide valve until the pressure obtained in said valve chamber from said communication is increased to a predetermined degree.

14. In a fluid pressure brake, the combination with a brake pipe and a brake controlling valve device operative upon a reduction in brake pipe pressure to effect an application of the brakes, and mechanism separate from the brake controlling valve device operative to effect a local reduction in brake pipe pressure for effecting the operation of said brake controlling valve device, said mechanism comprising valve means responsive to light variations in brake pipe pressure to first supply fluid under pressure to a passage and then cut off the supply of fluid under pressure to said passage, and a quick service means controlled by the fluid under pressure supplied to said passage for effecting a predetermined reduction in brake pipe pressure, said quick service means comprising a quick service reservoir, a poppet valve operative to vent fluid under pressure from said brake pipe to said quick service reservoir, an oppositely seating poppet valve for venting fluid under pressure from said quick service reservoir to the atmosphere, means connecting said valves for effecting simultaneous movement thereof, means for closing communication past one of said valves at the same time as communication is opened past the other of said valves, a movable abutment operated by fluid under pressure supplied through said communication to one face for moving said valves in one direction and having means for venting fluid under pressure from said communication, pressure exerting means acting on the opposite face of said abutment for moving said abutment away from said valves, and pressure exerting means acting on one of said valves for shifting said valves upon movement of said abutment by the first mentioned pressure exerting means.

15. In a fluid pressure brake, the combination with a brake pipe, of a quick service valve device operative to effect a series of light reductions in brake pipe pressure, said quick service valve device being controlled by opposing pressures in two chambers and operative upon an increase in pressure in one of said chambers to effect a light reduction in brake pipe pressure and operative upon an increase in pressure in the other of said chambers to close the communication through which said reduction in brake pipe pressure is effected, valve means operative upon a light reduction in brake pipe pressure to supply a limited amount of fluid under pressure to said one chamber, and means operative upon the closing off of the supply of fluid to said one chamber to supply fluid under pressure to said other chamber.

16. In a fluid pressure brake, the combination with a brake pipe, of a quick service valve device operative to effect a series of light reductions in brake pipe pressure, said quick service valve device being controlled by opposing pressures in two chambers and operative upon an increase in pressure in one of said chambers to effect a light reduction in brake pipe pressure and operative upon an increase in pressure in the other of said chambers to close the communication through which said reduction in brake pipe pressure is effected, valve means operative upon a light reduction in brake pipe pressure to supply a limited amount of fluid under pressure to said one chamber, means for relieving the pressure in said one chamber, and means operative upon a reduction in pressure in said one chamber to supply fluid under pressure to said other chamber.

17. In a fluid pressure brake, the combination with a brake pipe, of a quick service valve device operative to effect a series of light reductions in brake pipe pressure, said quick service valve device being controlled by opposing pressures in two chambers and operative upon an increase in pressure in one of said chambers to effect a light reduction in brake pipe pressure and operative upon an increase in pressure in the other of said chambers to close the communication through which said reduction in brake pipe pressure is effected, valve means operative upon a light reduction in brake pipe pressure to supply a limited amount of fluid under pressure to said one chamber, each of said chambers having an always open vent for relieving the pressure of fluid therein, and means operative upon a reduction in pressure in said one chamber to supply fluid under pressure to said other chamber.

18. In a fluid pressure brake, the combination with a brake pipe, of a quick service valve device operative to effect a series of light reductions in brake pipe pressure, said quick service valve device being controlled by opposing pressure in two chambers and operative upon an increase in pressure in one of said chambers to effect a light reduction in brake pipe pressure and operative upon an increase in pressure in the other of said chambers to close the communication through which said reduction in brake pipe pressure is effected, valve means operative upon a light reduction in brake pipe pressure to supply a limited amount of fluid under pressure to said one chamber, each of said chambers having an always open vent for relieving the pressure of fluid therein, said quick service valve device being operative upon a reduction in pressure in said one chamber to supply fluid under pressure to said other chamber.

19. In a fluid pressure brake, the combination with a brake pipe, of a quick service valve device controlled by the opposing pressures in two chambers each of which is provided with a vent for relieving pressure, said valve device being operative by alternate increases in pressure in said chambers to effect a series of light reductions in brake pipe pressure, valve means operative upon a series of light reductions in brake pipe pressure to provide a series of spaced increases in pressure in one of said chambers, and means operative, during the interval between two successive increases in pressures in the last mentioned chamber, to provide an increase in pressure in the other of said chambers.

20. In a fluid pressure brake, the combination with a brake pipe, of a valve device responsive to a service reduction in brake pipe pressure to vent fluid under pressure from said brake pipe for a chosen interval of time and then operative to close the communication through which fluid under pressure is adapted to be vented from said brake pipe, valve means actuated by fluid vented from the brake pipe by the operation of said valve device for effecting a local quick service reduction in brake pipe pressure, and means operative upon the closing of said communication to effect the operation of said valve means to close the communication through which said local reduction in brake pipe pressure is adapted to be effected.

21. In a fluid pressure brake, the combination with a brake pipe, of a valve device controlled by a series of successive reductions in brake pipe pressure, spaced at chosen intervals, and operative during each of said intervals to effect a venting of fluid under pressure from said brake pipe and to close the communication through which fluid under pressure is adapted to be vented from the brake pipe, valve means actuated by the fluid vented from the brake pipe by the operation of said valve device for effecting a local reduction in brake pipe pressure, and means operative upon the closing of said communication and before the succeeding opening thereof to effect the operation of said valve means to close the communication through which said local reduction in brake pipe pressure is adapted to be effected.

EARLE S. COOK.